United States Patent
Nakai

(10) Patent No.: US 8,014,257 B2
(45) Date of Patent: Sep. 6, 2011

(54) EXTRACTION OPTICAL SYSTEM AND OPTICAL HEAD DEVICE INCLUDING THE SAME

(75) Inventor: Kenya Nakai, Toyko (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/738,549

(22) PCT Filed: Aug. 22, 2008

(86) PCT No.: PCT/JP2008/064969
§ 371 (c)(1),
(2), (4) Date: Apr. 16, 2010

(87) PCT Pub. No.: WO2009/050940
PCT Pub. Date: Apr. 23, 2009

(65) Prior Publication Data
US 2010/0214903 A1    Aug. 26, 2010

(30) Foreign Application Priority Data
Oct. 18, 2007    (JP) .................................. 2007-270923

(51) Int. Cl.
*G11B 7/00*    (2006.01)
(52) U.S. Cl. ......... 369/112.17; 369/112.01; 369/112.16; 369/112.18; 369/112.22
(58) Field of Classification Search .............. 369/112.01, 369/112.03, 112.04, 112.16, 112.17, 112.18, 369/112.22
See application file for complete search history.

(56) References Cited

U.S. PATENT DOCUMENTS

| 7,660,226 | B2 * | 2/2010 | Ogata | 369/112.18 |
| 7,796,488 | B2 * | 9/2010 | Kimura et al. | 369/112.01 |
| 7,839,753 | B2 * | 11/2010 | Ogata | 369/112.17 |
| 2007/0104072 | A1 * | 5/2007 | Ogata | 369/112.16 |
| 2008/0002555 | A1 * | 1/2008 | Hayasaka et al. | 369/112.24 |
| 2008/0247298 | A1 * | 10/2008 | Ogata | 369/112.23 |
| 2010/0091632 | A1 * | 4/2010 | Ogata | 369/112.16 |

FOREIGN PATENT DOCUMENTS

| JP | 2005-228436 A | 8/2005 |
| JP | 2006-252599 A | 9/2006 |
| JP | 2006-252716 A | 9/2006 |
| JP | 2006-344344 A | 12/2006 |
| JP | 2007-133918 A | 5/2007 |
| WO | WO 2004/113974 A1 | 12/2004 |

* cited by examiner

*Primary Examiner* — Thuy N Pardo
(74) *Attorney, Agent, or Firm* — Birch, Stewart, Kolasch & Birch, LLP

(57) ABSTRACT

An object of the present invention is to provide an extraction optical system capable of separating and extracting a signal light and a stray light with a simple configuration, and an optical head device including the same. A phase plate and a phase plate are $+\lambda/4$ phase plates, while a phase plate and a phase plate are $-\lambda/4$ phase plates. A focal line, a focal line and a focal line represent a focal line of a stray light, a focal line of a reproduction light and a focal line of a stray light, respectively. All beams of the reproduction light enter the state in which a polarization direction is rotated by 90 degrees after passing through the phase element. In contrast to the all light bundles of the reproduction light, polarization directions of all light bundles of the stray lights and are not rotated even after passing through the phase element.

10 Claims, 9 Drawing Sheets

FIG. 3
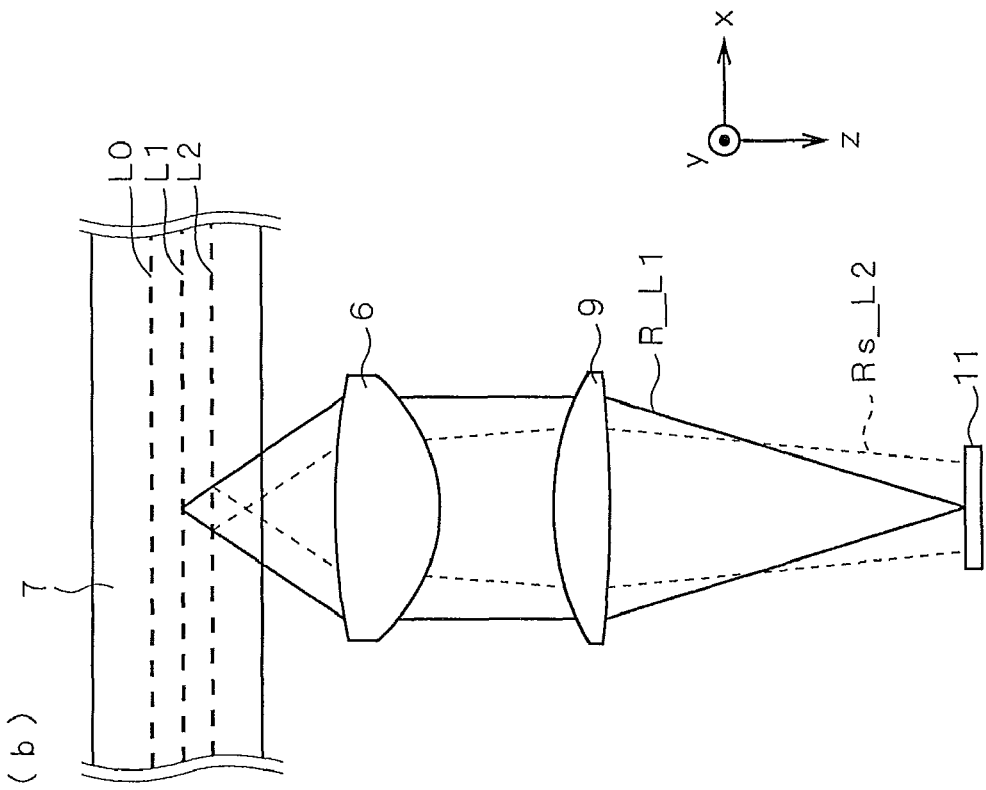
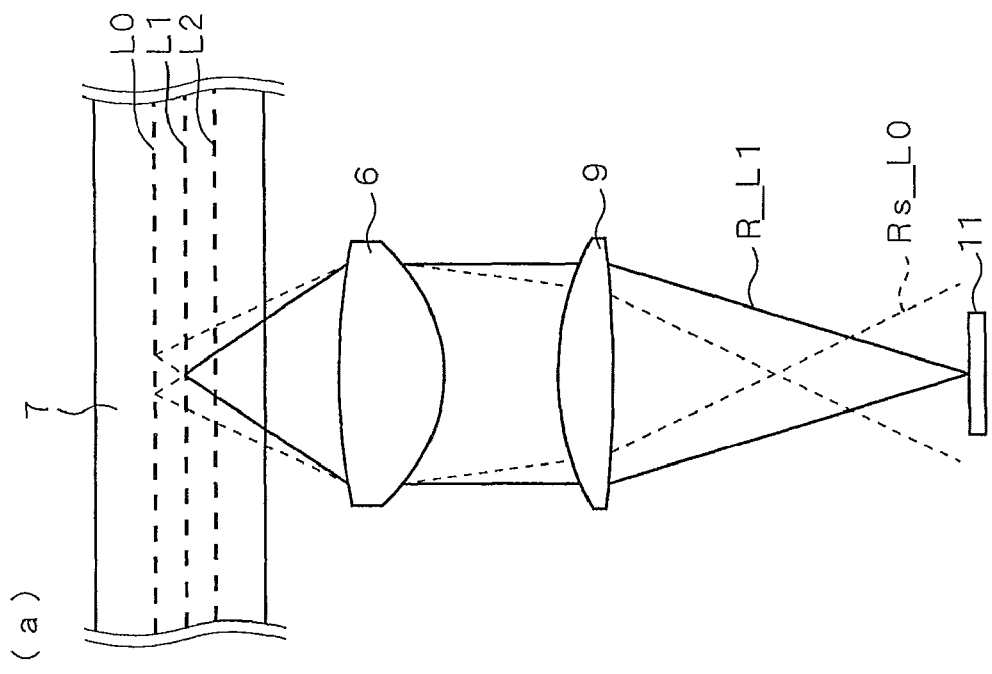

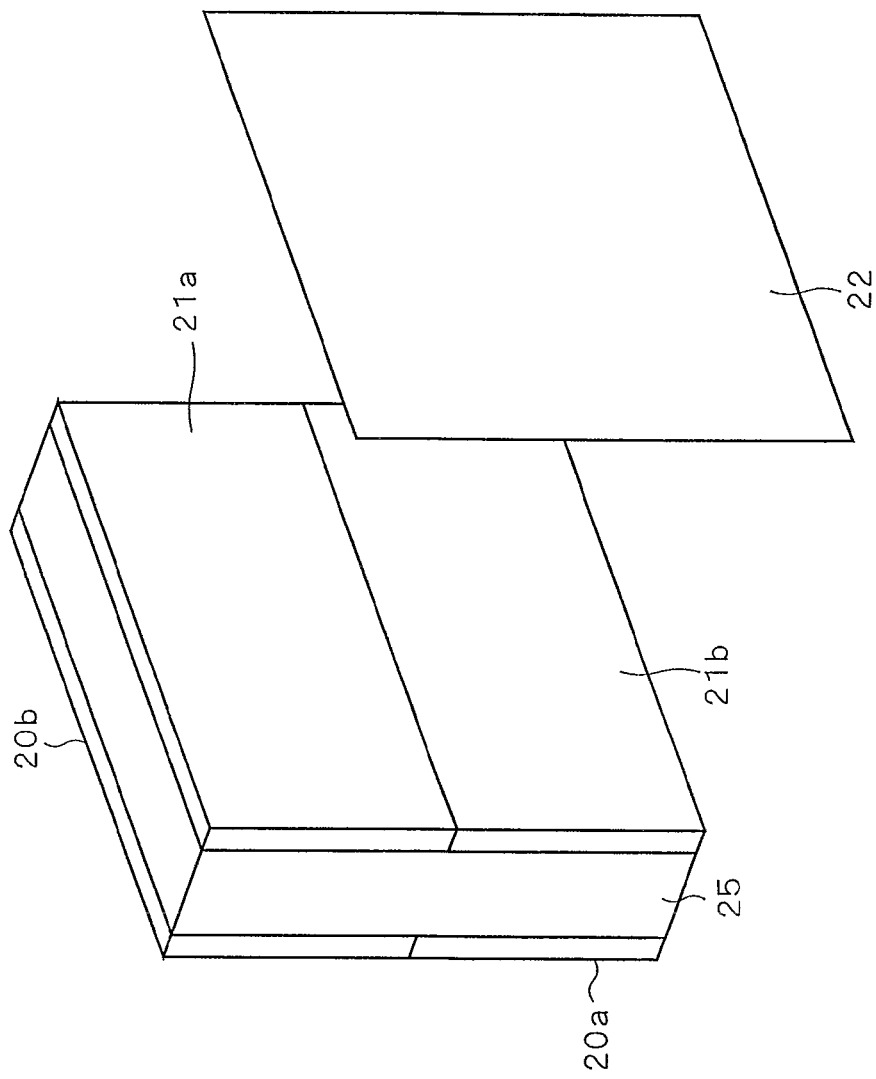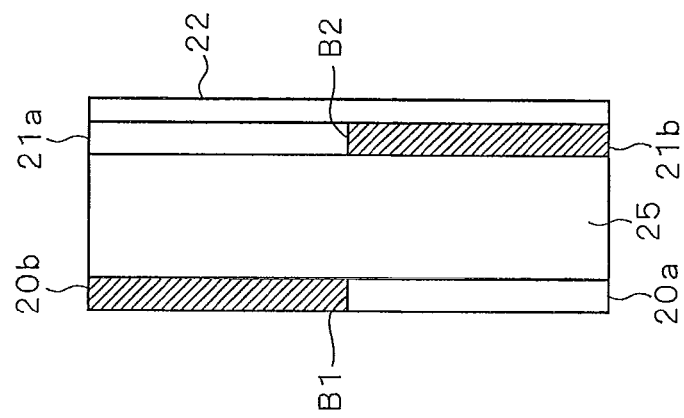
FIG. 6

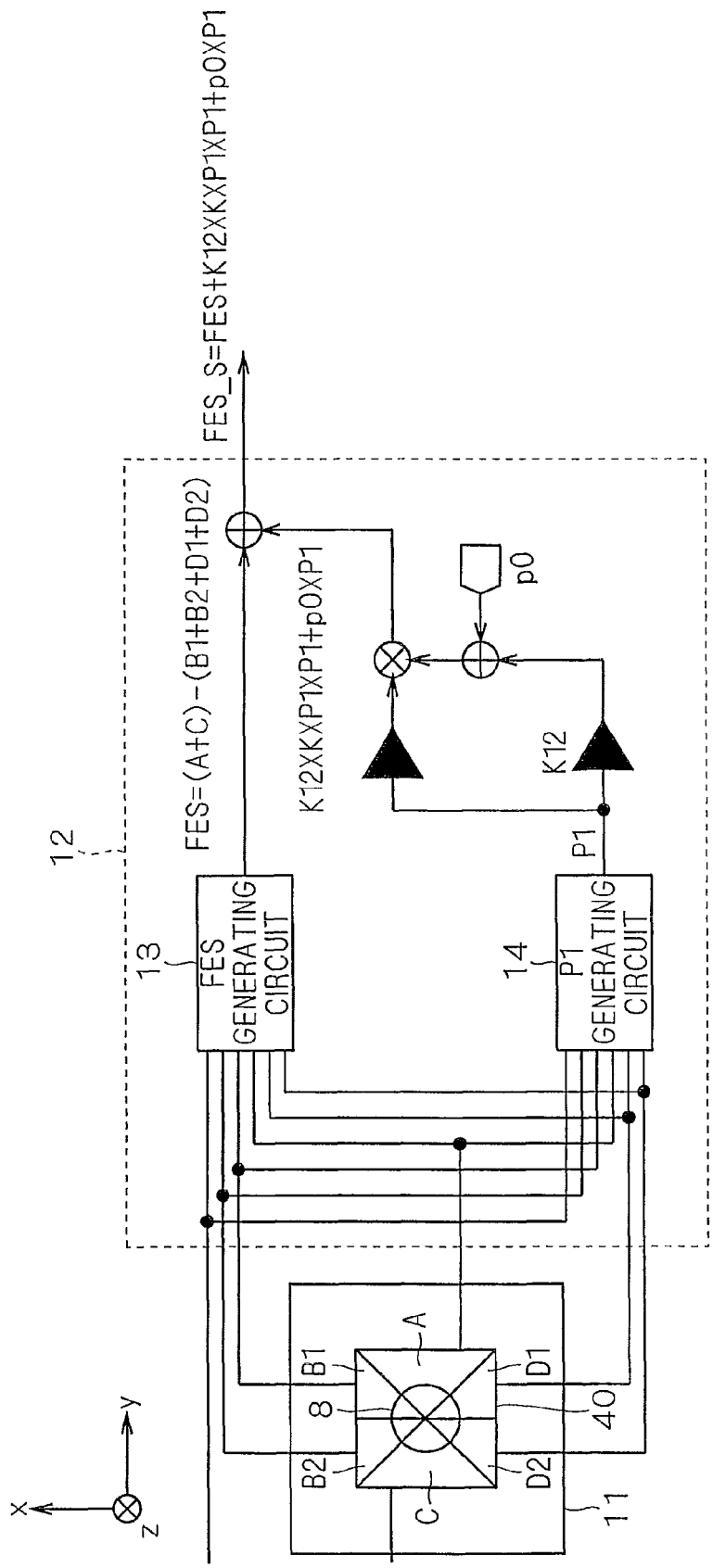

EXTRACTION OPTICAL SYSTEM AND OPTICAL HEAD DEVICE INCLUDING THE SAME

TECHNICAL FIELD

The present invention relates to an extraction optical system which separates and extracts a return light from a specific object and a return light from other object, which becomes a stray light, among return lights from a plurality of objects, and to an optical head device which separates and extracts a signal light component from a light beam which is reflected from a multilayer recording medium and includes both a signal light component and a stray light component.

BACKGROUND ART

Conventionally, capacities of various types of optical disks have been increased by reducing a volume of information written on tracks of the disk and also reducing a size of a focusing spot on a focal plane through reduction of a wavelength of a laser light used in recording and reproducing and employment of an objective lens having a large numerical aperture.

For example, in a compact disc (CD), a thickness of a disk substrate serving as a light transmission layer (transparent protective layer and space layer provided on an information recording layer, which is also referred to as a transparent substrate) is approximately 1.2 mm, a laser light wavelength is approximately 780 nm, a numerical aperture (NA) of an objective lens is 0.45, and a capacity is 650 MB. Further, in a digital versatile disc (DVD), a thickness of a disk substrate serving as a light transmission layer is approximately 0.6 mm, a laser light wavelength is approximately 650 nm, an NA is 0.6, and a capacity is 4.7 GB. For example, a DVD is used as a disk having a thickness of 1.2 mm by bonding two disk substrates having a thickness of approximately 0.6 mm to each other.

Further, in a blu-ray disc (BD) which has a higher density, an optical disk in which a thickness of a light transmission layer is reduced to 0.1 mm is used such that a laser light wavelength is approximately 405 nm and an NA is 0.85, to thereby achieve a capacity as large as 25 GB per layer.

In addition, there is a high definition digital versatile disc (HDDVD) achieving a large capacity of 18 GB or more by using an optical disk in which a thickness of a disk substrate serving as a light transmission layer is set to 0.6 mm as in a DVD such that a laser light wavelength is approximately 405 nm and an NA is 0.65.

An effective way for achieving a larger capacity in an optical disk is increasing layers of the optical disk. So far, as to a DVD, a dual-layer DVD-ROM, a dual-layer DVD-R and the like have been achieved. In the same manner, dual-layer has been achieved as a technique of increasing a capacity of a BD disk and an HD-DVD disk, and further, there has been progress in the research and development of a multilayer optical disk including 6 layers or 8 layers.

In increasing layers of an optical disk, it is desired to reduce an interval between information recording layers, that is, a distance between layers as much as possible to reduce a spherical aberration which is generated due to a change in thickness of a transparent layer in a case of an inter-layer jump. However, if a distance between layers is made excessively small, there arises a problem that a stray light from an information recording layer other than one for reproducing and recording leaks in, which deteriorates a reproduction signal. The above-mentioned leak-in of the stray light is also referred to as inter-layer crosstalk.

There are proposed several techniques for solving the problem of the above-mentioned inter-layer crosstalk.

The technology described in Patent Document 1 is the extraction optical system for separating and extracting the stray light and reproduction light with a +λ/4 phase plate and a −λ/4 phase plate. Here, the +λ/4 phase plate or −λ/4 phase plate is a birefringent optical element which changes a polarization state of an incident light emerged from a linearly polarized light into a circularly polarized light. Assuming that the +λ/4 phase plate provides light with right optical rotation, the −λ/4 phase plate is defined to provide left optical rotation, and thus a +λ/4 or −λ/4 phase difference is provided to an electric field component of a light parallel to a principal axis direction of birefringence.

However, the extraction optical system of Patent Document 1 is configured to temporarily focus a reflected return light from a multilayer disk with a light focus lens and separate and extract a reproduction light at a position where it turns into a divergent light after reaching a focal point thereof. Therefore, a light receiving device for receiving a reproduction light to generate a reproduction signal is required to collect light again for collecting the reproduction light therein.

In a case where the above-mentioned extraction optical system is applied to an optical head device, it is difficult to configure the extraction optical system without extending an optical path of an optical system for detecting a focus error signal and a tracking error signal which is required in the optical head device.

In order to solve the above-mentioned problem, in the technology described in Patent Document 2, there is configured the optical path systems for detecting a focus error signal and detecting a tracking error signal in the optical head device for removing a stray light from a multilayer disk by disposing a reflective plate which reflects a focused light beam at the focal point for folding the optical path where light is temporarily focused, and also disposing a phase control element in the folded optical path.

However, the folded optical path complicates the optical configuration of the optical head device, and further, loss in quantity of light is generated by an amount by which light passes through optical components disposed in the folded optical path, which is disadvantageous in signal S/N.

In the technology described in Patent Document 3, a return light is separated into two semicircular focused light bundles, and the semicircular focused light bundles are received by light separating and receiving devices which are respectively disposed at focal point positions thereof. In addition, output signals of two light receiving elements of the light separating and receiving devices are selected in accordance with a stray light from the layer which is on the side far from the reproducing layer or a stray light which is on the side close thereto with respect to the optical head device, to thereby obtain a reproduction signal. Accordingly, it is possible to configure the optical path systems for detecting a focus error signal and detecting a tracking error signal at the same time in the optical head device.

However, in a multilayer disk of three or more layers, information recording layers are adjacent to both sides of a reproducing layer in some cases, which causes a problem that the reproduction light cannot be separated and extracted from the stray light.

Patent Document 1: Japanese Patent Application Laid-Open No. 2006-252716

Patent Document 2: Japanese Patent Application Laid-Open No. 2007-133918

Patent Document 3: Japanese Patent Application Laid-Open No. 2005-228436

In the conventional extraction optical system or the optical head device in which the conventional extraction optical system is mounted, it is difficult to easily configure the extraction optical system and the optical system for detecting a focus error and a tracking error at the same time. In addition, considering the configuration of the extraction optical system, it is difficult to detect those from light receiving patterns provided in the same light receiving device.

Therefore, the extraction optical system is required to be configured separately from the optical system for detecting a focus error and a tracking error, and accordingly the number of components is large, which complicates the optical configuration.

DISCLOSURE OF INVENTION

The present invention has been made to solve the above-mentioned problems, and therefore an object thereof is to provide an extraction optical system capable of separating and extracting a signal light and a stray light with a simple configuration, and an optical head device including the same.

In order to solve the above-mentioned problems, an extraction optical system according to claim 1 is an extraction optical system extracting, from a light bundle in which a signal light component and stray light components are mixed, the signal light component, the light bundle being supplied through a light focus optical device focusing the light bundle and astigmatism adding means adding astigmatism to the light bundle, the extraction optical system including: a first phase element including a first phase change area generating a phase difference of $(+\lambda/4)$ times of a wavelength to polarization components of the light bundle which are in an orthogonal relationship, and a second phase change area generating a phase difference of $(-\lambda/4)$ times of a wavelength to the polarization components of the light bundle which are in an orthogonal relationship; a second phase element including a third phase change area generating a phase difference of $(+\lambda/4)$ times of a wavelength to the polarization components of the light bundle which are in an orthogonal relationship, and a fourth phase change area generating a phase difference of $(-\lambda/4)$ times of a wavelength to the polarization components of the light bundle which are in an orthogonal relationship; and a separation element allowing only the signal light component among the signal light component and the stray light components which have passed through the first phase element to pass therethrough, or absorbing or reflecting only the stray light components in accordance with polarization directions thereof, wherein: the first phase element is divided into the first phase change area and the second phase change area by a first boundary, the first boundary being parallel to a first focal line in which the signal light component forms an image into a line shape on a side closer to the light focus optical device than a first focal point position on an optical axis of the light focus optical device at which the signal light component focused by the light focus optical device forms a smallest circle of confusion, and being orthogonal to the optical axis of the light focus optical device; the second phase element is divided into the third phase change area and the fourth phase change area by a second boundary parallel to the first boundary; the first phase change area and the third phase change area are disposed to be symmetrical with respect to the first focal line; the second phase change area and the fourth phase change area are disposed to be symmetrical with respect to the first focal line; the first phase element is disposed between the first focal point position and the first focal line; and the second phase element is disposed between the first focal line and a second focal line in which the stray light components form an image into a line shape on a side closer to the light focus optical device than a second focal point position at which the stray light components form a smallest circle of confusion on the side closer to the light focus optical device than the first focal point position.

According to the extraction optical system of the present invention, it is possible to separate and extract a signal light and a stray light with a simple configuration by using a fact that a light bundle changes its position, preceding or succeeding a focal line thereof, in a manner symmetric with respect to a plane passing through the focal line and the optical axis.

These and other objects, features, aspects and advantages of the present invention will become more apparent from the following detailed description of the present invention when taken in conjunction with the accompanying drawings.

BRIEF DESCRIPTION OF DRAWINGS

FIG. 3 are diagrams briefly showing a state of a stray light from a layer other than a reproducing layer of a multilayer disk in the light receiving device.

FIG. 6 are views showing a specific example of a phase element constituting the extraction optical system.

FIG. 10 is a diagram showing yet still another example of the light receiving surface pattern of the light receiving device and another example of the focus error signal generating circuit.

BEST MODE FOR CARRYING OUT THE INVENTION

First Embodiment

Figure 1:
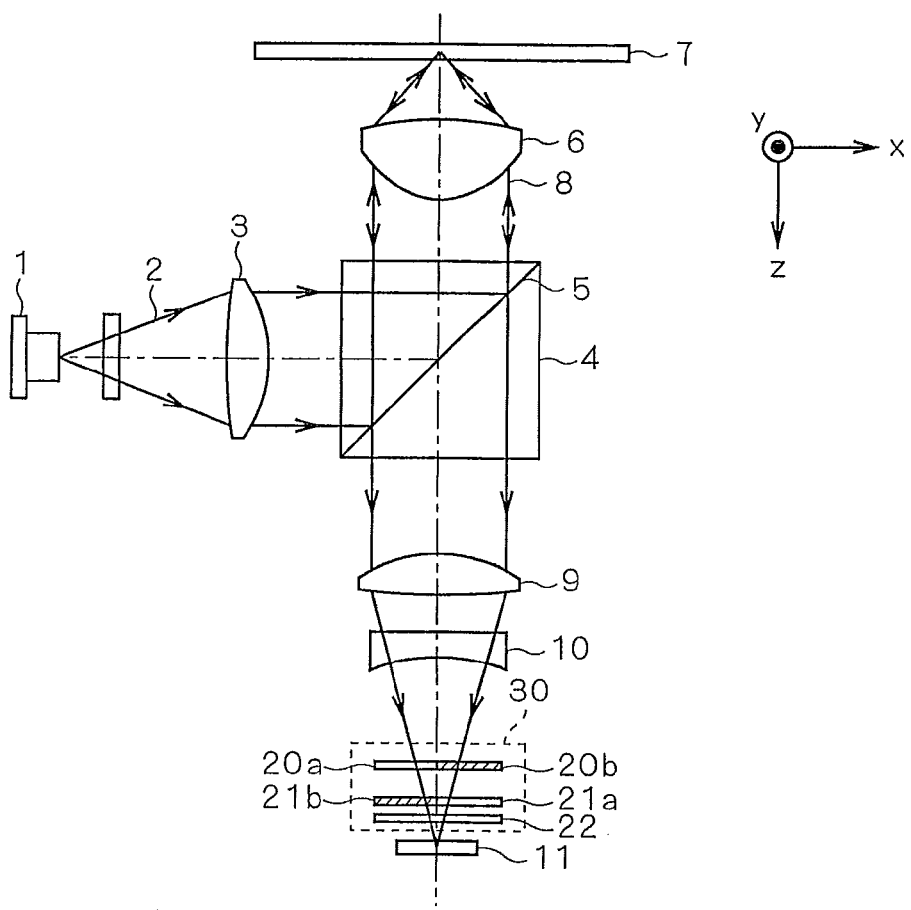
FIG. 1 is a schematic configuration diagram of an optical head device using an extraction optical system according to a first embodiment of the present invention.

FIG. 1 is a schematic configuration diagram of an optical head device including an extraction optical system according to a first embodiment of the present invention.

In FIG. 1, a light beam 2 radiated from a semiconductor laser 1 which is a light source is converted into a parallel light bundle by a collimator lens 3. A beam splitter 4 includes a reflective film 5, and in this case, deflects the light beam 2 by 90 degrees in a −z direction. An objective lens 6 focuses the light beam 2 deflected by the beam splitter 4 on an information recording surface of an optical disk 7. A return light 8 obtained by the light beam 2 being reflected by the optical disk 7 passes through the objective lens 6 and the beam splitter 4 again. A light focus lens 9 is a lens for focusing the return light 8 on a light receiving device 11, and a cylindrical lens 10 is a lens as means of adding astigmatism to the return light 8. Note that the means of adding astigmatism is not limited to a cylindrical lens, and may be, for example, a hologram element having a curved diffraction pattern or the like.

An extraction optical system 30 indicated by a dotted line frame is composed of a phase plate 20a, a phase plate 20b, a phase plate 21a, a phase plate 21b and an analyzer 22. The return light 8 which has passed through the cylindrical lens 10 passes through the extraction optical system 30 to be received by the light receiving device 11.

The light receiving device 11 includes a light receiving surface which is separated into a plurality of pieces, and converts a quantity of light received in each piece of the light receiving surface into an electrical signal. The electrical signal is computed so as to be converted into a desired signal inside or outside the light receiving device 11. In a device which performs recording and reproducing on an optical disk, a reproduction signal, a focus error signal, a tracking error signal and the like are generated.

Figure 2:
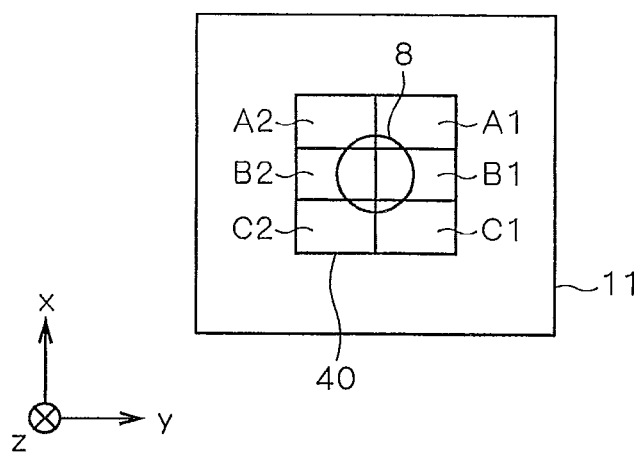
FIG. 2 is a diagram showing an example of a light receiving surface pattern of a light receiving device.

FIG. 2 is a diagram showing an example of a light receiving surface pattern of the light receiving device 11 shown in FIG. 1. In FIG. 2, a light receiving surface 40 is divided into six pieces, and receives the return light 8 from the reproducing layer as optical signals A1, A2, B1, B2, C1 and C2.

A focus error signal FES is computed from FES=(A1+A2)+(C1+C2)−(B1+B2). A tracking error signal TES is computed from TES=(A1+B1+C1)−(A2+B2+C2). The focus error signal FES and the tracking error signal TES are used as control signals for driving the objective lens 6 in an optical axis direction (z-axis direction of FIG. 1) of the objective lens 6 and in a radial direction (y-axis direction of FIG. 1) of the optical disk 7, respectively, which are used for controlling so as to allow a light beam to be accurately focused on the information recording layer of the optical disk 7 and also to follow an information track with accuracy.

The above-mentioned control method is not a main part of the present invention, and therefore a drawing and detailed description thereof will be omitted. The optical head device corresponds to a multilayer disk in the present embodiment.

Next, with reference to FIG. 3, description will be given of a stray light from one other than the reproducing layer, which is generated in the multilayer disk.

FIG. 3 are diagrams briefly showing a state of the stray light from one other than the reproducing layer of the multilayer disk in the light receiving device. In FIG. 3, a return optical system after the light beam is reflected by the optical disk 7 is indicated only by the objective lens 6 and the light focus lens 9 for simplification.

FIG. 3(a) shows a stray light Rs_L0 from an L0 layer positioned in a direction farther from the objective lens 6 than an L1 layer which is a reproducing layer. Here, a reproduction light and a stray light are indicated by a solid line and a dotted line, respectively. The stray light Rs_L0 from the L0 layer is temporarily focused preceding the light receiving device 11, and then becomes a divergent light to be distributed over the entire light receiving surface.

On the other hand, FIG. 3(b) shows a stray light Rs_L2 from an L2 layer positioned in a direction closer to the objective lens 6 than the L1 layer which is the reproducing layer. The stray light Rs_L2 from the L2 layer is a converging light whose focal point is located at a position beyond the light receiving device 11, and is distributed in the light receiving surface in a spreading manner.

As shown in FIG. 3, in a case where a reproducing layer is located between other layers in a multilayer disk including three or more information recording layers, the stray lights shown in FIG. 3(a) and FIG. 3(b) are both received at the same time by the light receiving device 11.

The extraction optical system according to the present invention is an optical system for separating, among return lights from objects (corresponding to the L0 layer, L1 layer and L2 layer in the first embodiment) disposed at different positions in the focal point direction, the above-mentioned two lights (stray light Rs_L0 and stray light Rs_L2 in the first embodiment) and a return light (corresponding to the reproduction light R_L1 in the first embodiment) from a specific object positioned at the focal point of the objective lens.

Figure 4:
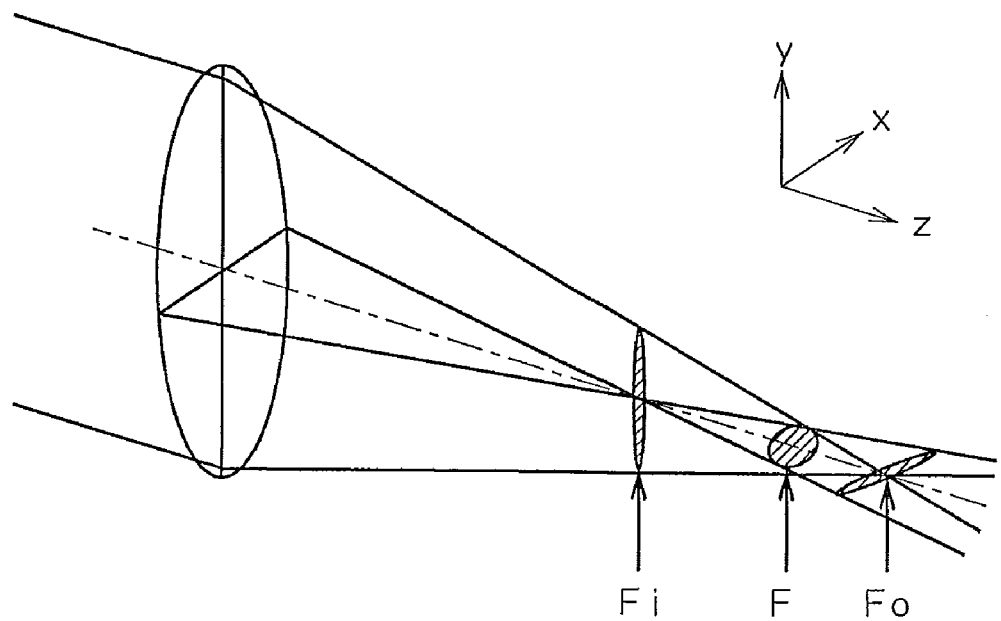
FIG. 4 is a diagram for describing image formation of a focused beam to which astigmatism is added by a cylindrical lens.
Figure 5:
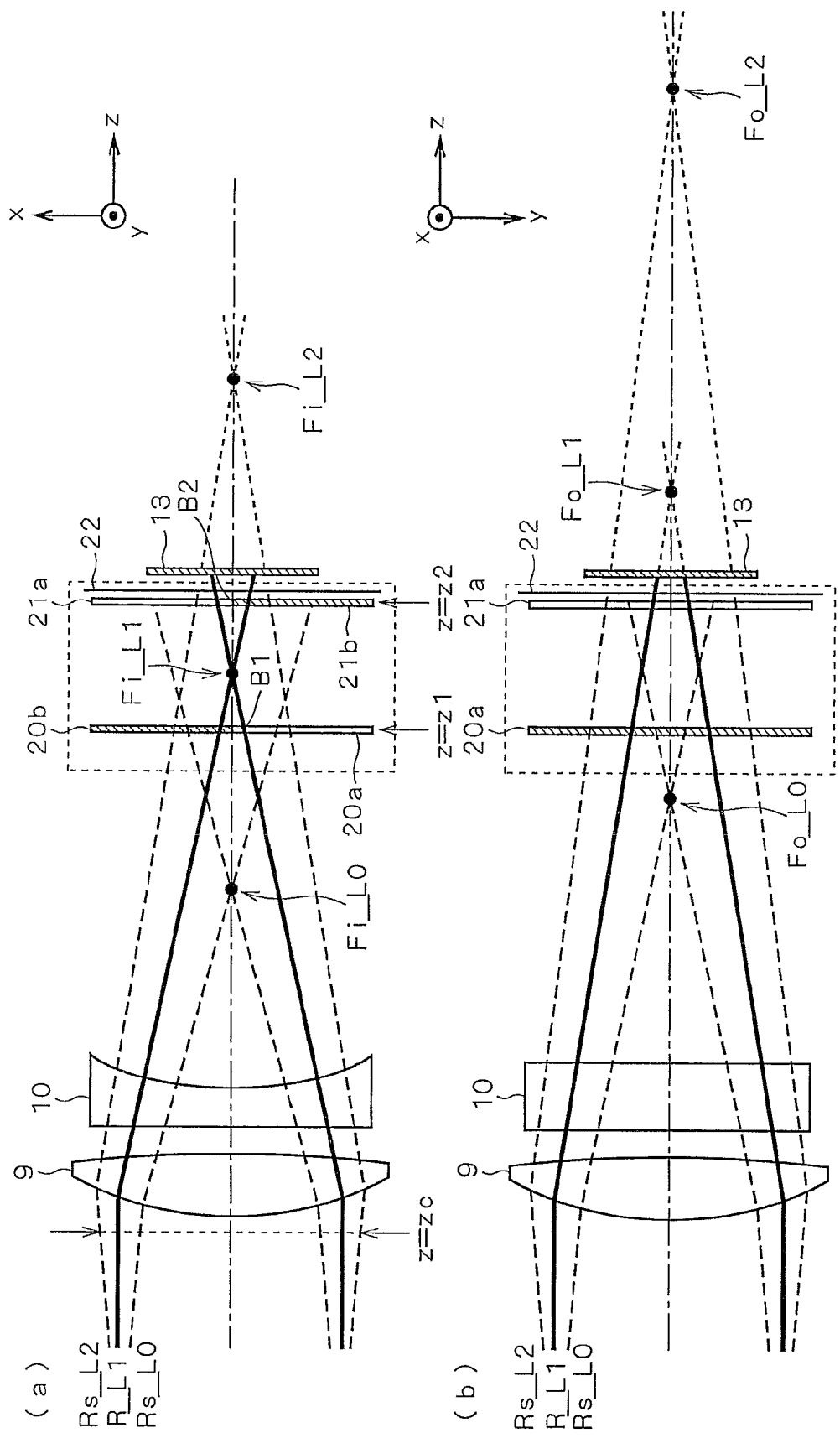
FIG. 5 are detailed explanatory diagrams of the extraction optical system.

FIG. 4 is a diagram for describing imaging of a focused light beam to which astigmatism is added by the cylindrical lens 10. FIG. 5 are detailed explanatory diagrams of the extraction optical system 30 which is shown in the schematic configuration diagram of FIG. 1, which show a case where both stray lights shown in FIG. 3(a) and FIG. 3(b) are mixed.

Prior to description with reference to FIG. 5, optical property of astigmatism will be described with reference to FIG. 4. As shown in FIG. 4, by its nature, the focused light beam to which astigmatism is added generally forms an image into a line shape (focal line) parallel to the y-axis at a position Fi along a z-axis direction, and then generally forms a smallest circle of confusion at a position F (focal point) to form an image into a line shape (focal line) parallel to the x-axis at a position Fo. Note that in FIG. 5, the light receiving device 11 is disposed at the focal point position of the reproduction line R_L1.

FIG. 5(a) shows, as to the stray light Rs_L0, the stray light Rs_L2 and the reproduction light R_L1, rays in an x-z plane which form an image into the focal line Fi.

FIG. 5(b) shows, as to the stray light Rs_L0, the stray light Rs_L2 and the reproduction light R_L1, rays in a y-z plane which form an image into the focal line Fo.

With reference to FIG. 5(a), the extraction optical system 30 will be described in detail.

The phase plate 20a and the phase plate 21a are +λ/4 phase plates which provide a phase difference of (+¼) times of a wavelength to polarization components of the return light 8 which are in an orthogonal relationship, whereas the phase plate 20b and the phase plate 21b are −λ/4 phase plates which provide a phase difference of (−¼) times of a wavelength to polarization components of the return light 8 which are in an orthogonal relationship. A phase element 20 is composed of the −λ/4 phase plate 20b disposed on the +x side and the +λ/4 phase plate 20a disposed on the −x side, and a phase element 21 is composed of the +λ/4 phase plate 21a disposed on the +x side and the −λ/4 phase plate 20b disposed on the −x side. In other words, the phase element 20 is divided into the phase plate 20a and the phase plate 20b by a boundary B1, and the phase element 21 is divided into the phase plate 21a and the phase plate 21b by a boundary B2 (strictly speaking, the boundaries B1 and B2 have a plane shape not a line shape because the phase elements 20 and 21 each have a limited thickness, but they are referred to as boundaries for the sake of the description). The analyzer 22 allows only the polarized light in one direction, and a light receiving surface 13 is provided to the light receiving device 11 shown in FIG. 1 and FIG. 3, which receives the light which has passed through the analyzer 22. A focal line Fi_L0, a focal line Fi_L1 and a focal line Fi_L2 indicate a focal line of the stray light Rs_L0, a focal line of the reproduction light R_L1 and a focal line of the stray light Rs_L2, respectively.

Next, an operation of the extraction optical system 30 will be described.

The phase element 20 is placed at z=z1, and the phase element 21 is placed at z=z2 (where z1<z2). A position of an entrance pupil of the collimator lens 9 is z=zc (zc<z1).

First, the reproduction light R_L1 from the L1 layer will be described.

A light beam on the +x side of the reproduction light R_L1 at z=zc is circularly polarized due to generation of a −λ/4 phase difference by the phase plate 20b, is then positioned on the −x side with the focal line Fi_L1 being a border, and becomes a light beam in which the polarization is rotated by 90 degrees with respect to the polarization at z=zc due to further generation of the −λ/4 phase difference by the phase plate 21b.

On the other hand, the light beam on the −x side of the reproduction light R_L1 at z=zc is circularly polarized due to generation of a +λ/4 phase difference by the phase plate 20a, is then positioned on the +x side with the focal line Fi_L1 being a border, and becomes a light beam in which the polarization is rotated by 90 degrees with respect to the polarization at z=zc due to further generation of the +λ/4 phase difference by the phase plate 21a.

That is, all light bundles of the reproduction light R_L1 enter the state in which the direction of polarization is rotated by 90 degrees after passing through the phase element 21.

Next, the stray light Rs_L0 from the L0 layer will be described.

The light beam on the +x side of the stray light Rs_L0 at z=zc is positioned on the −x side with the focal line Fi_L0 being a border, has circular polarization due to generation of the +λ/4 phase difference by the phase plate 20a, and then becomes the light beam whose polarization is the same as the polarization at z=zc due to generation of the −λ/4 phase difference by the phase plate 21b.

On the other hand, the light beam on the −x side of the stray light Rs_L0 at z=zc is positioned on the +x side with the focal line Fi_L0 being a border, has circular polarization due to generation of the −λ/4 phase difference by the phase plate 20b, and then becomes a light beam whose polarization is the same as the polarization at z=zc, in a similar manner as the light beam on the +x side of the stray light Rs_L0, due to generation of the +λ/4 phase difference by the phase plate 21a.

That is, differently from the all light bundles of the reproduction light R_L1, in the all light bundles of the stray light Rs_L0, the direction of polarization is not rotated even after passing through the phase element 21.

Next, the stray light Rs_L2 from the L2 layer will be described.

A light beam on the +x side of the stray light Rs_L2 at z=zc has circular polarization due to generation of a −λ/4 phase difference by the phase plate 20b, and then becomes a light beam whose polarization is the same as the polarization at z=zc due to generation of the +λ/4 phase difference by the phase plate 21a.

On the other hand, a light beam on the +x side of the stray light Rs_L2 at z=zc has polarization due to generation of the +λ/4 phase difference by the phase plate 20a, and then becomes a light beam whose polarization is the same as the polarization at z=zc, in a similar manner as the light beam on the +x side of the stray light Rs_L2 due to generation of the −λ/4 phase difference by the phase plate 21b.

That is, differently from the all light bundles of the reproduction light R_L1, in all light bundles of the stray light Rs_L2, the direction of polarization is not rotated even after passing through the phase element 21.

Accordingly, the return light 8 composed of the reproduction light R_L1, the stray light Rs_L0 and the stray light Rs_L2 is allowed to pass through the phase element 20 and the phase element 21, whereby it is possible to allow only the reproduction light to undergo polarization rotation by 90 degrees. The analyzer 22 is disposed so as to allow only the light which has the same polarization as that of the reproduction light to pass among lights which have passed through the phase element 21, whereby only the reproduction light is extracted to be received on the light receiving surface 13.

As described above, though FIG. 5(b) shows a state which is viewed in the y-z plane, contrary to the case which is viewed in the x-z plane as FIG. 5(a), the phase element 20 and the phase element 21 are isotropic in the y direction, and thus the light beam on the +y side and the light beam on the −y side are under the same action. Note that a focal line Fo_L0, a focal line Fo_L1 and a focal line Fo_L2 indicate a focal line of the stray light Rs_L0, a focal line of the reproduction light R_L1 and a focal line of the stray light Rs_L2, respectively.

FIG. 6 are views showing a specific example of the phase elements 20 and 21 constituting the extraction optical system 30 according to the present embodiment. FIG. 6(a) and FIG. 6(b) correspond to a side view and a perspective view thereof, respectively.

In FIG. 6, the phase element 20 and the phase element 21 are bonded to both sides of a transparent material 25 of a parallel plate, and further the analyzer 22 is bonded to the phase plate 21 to be integrated therewith, which is suitable for a reduction in cost for assembling the optical head device.

Alternatively, for example, the phase element 20 and the phase element 21 may be formed of a polarization element of photonic crystal or the like, which has a periodically concavo-convex shape and is formed of a multilayer film including alternately-laminated high refractive index layers and low refractive index layers, as proposed in International Publication No. 2004/113974. Accordingly, it is possible to secure high polarization property with high accuracy.

Still alternatively, the phase element 20 and the phase element 21 may be formed of a polymer orientation film or a material exhibiting birefringent property such as liquid crystal polymer or optical crystal.

Figure 7:
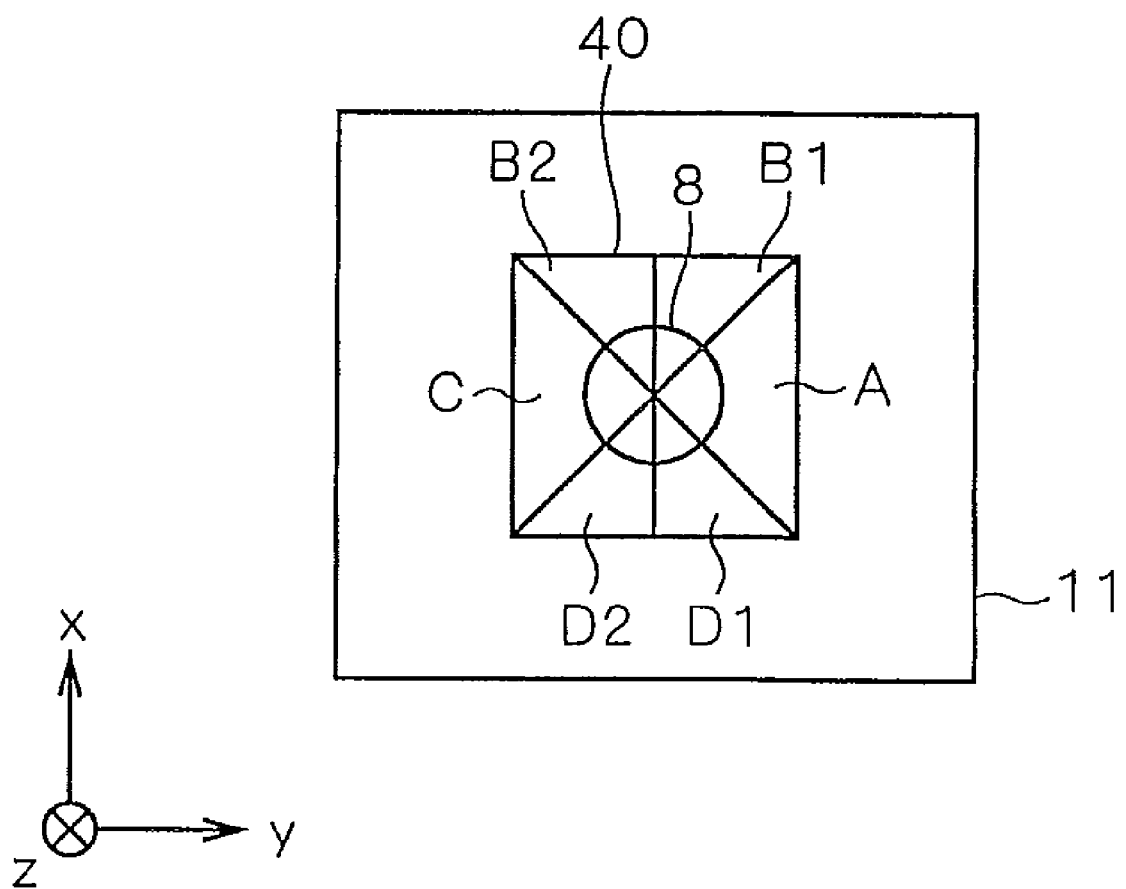
FIG. 7 is a diagram showing another example of the light receiving surface pattern of the light receiving device.

Further, a light receiving device having a light receiving pattern shown in FIG. 7 may be used as another form of the light receiving device 11. The focus error signal FES is computed from FES=(A+C)−(B1+B2+D1+D2). The tracking error TES is computed from TES−(A+B1+D1)−(C+B2+D2).

Conventionally, in order to separate and extract a reproduction light and a stray light, it is required that the stray light Rs_L0 and the reproduction light R_L1 be temporarily focused preceding a light receiving device (that is, at a position on the −z direction side). However, in the present invention, astigmatism is added to a light beam, and a light receiving device is disposed at a position where the light beam becomes a smallest circle of confusion, whereby the stray light Rs_L0 and the reproduction light R_L1 are focused before reaching the light receiving device (that is, at a position on the −z direction side), which enables detection of a focus error and detection of a tracking error.

As described above, the extraction optical system according to the present embodiment is the extraction optical system 30 extracting, from a light bundle (light beam 2) in which a signal light component (reproduction light R_L1) and stray light components (stray lights Rs_L0, Rs_L2) are mixed, the signal light component, the light bundle being supplied through a light focus optical device (light focus lens 9) focusing the light bundle and astigmatism adding means (cylindrical lens 10) adding astigmatism to the light bundle, the extraction optical system including: a first phase element (phase element 21) including a first phase change area (phase plate 21a) generating a phase difference of (+λ/4) times of a wavelength (λ) to polarization components of the light bundle which are in an orthogonal relationship, and a second phase change area (phase plate 21b) generating a phase difference of (−¼) times of a wavelength to the polarization components of the light bundle which are in an orthogonal relationship; a second phase element (phase element 20) including a third phase change area (phase plate 20a) generating a phase difference of (+¼) times of a wavelength to the polarization components of the light bundle which are in an orthogonal relationship, and a fourth phase change area (phase plate 20b) generating a phase difference of (−¼) times of a wavelength to the polarization components of the light bundle which are in an orthogonal relationship; and a separation element (analyzer 22) allowing only the signal light component among the signal light component and the stray light components which have passed through the first phase element to pass therethrough, or absorbing or reflecting only the stray light components in accordance with polarization directions thereof.

Further, the first phase element is divided into the first phase change area and the second phase change area by a first boundary (boundary B2), the first boundary being parallel to a first focal line (focal line Fi_L1) in which the signal light component forms an image into a line shape on a side closer to the light focus optical device than a first focal point position on an optical axis of the light focus optical device at which the signal light component focused by the light focus optical device forms a smallest circle of confusion, and being orthogonal to the optical axis of the light focus optical device; the second phase element is divided into the third phase change area and the fourth phase change area by a second boundary (boundary B1) parallel to the first boundary; the first phase change area and the third phase change area are disposed to be symmetrical with respect to the first focal line; the second phase change area and the fourth phase change area are disposed to be symmetrical with respect to the first focal line; the first phase element is disposed between the first focal point position and the first focal line; and the second phase element is disposed between the first focal line and a second focal line (focal line Fi_L0) in which the stray components form an image into a line shape on a side closer to the light focus optical device than a second focal point position at which the stray light components form a smallest circle of confusion on the side closer to the light focus optical device than the first focal point position.

According to the extraction optical system of the present embodiment, with the use of the fact that the bundle of return light changes its position preceding and succeeding the focal line thereof so as to be symmetrical with respect to a plane passing through the focal line and an optical axis, the configuration is made by respectively disposing the phase elements preceding and succeeding the focal line so that one half bundle of the reproduction light passes through the +λ/4 phase plate two times and the other half bundle thereof passes through the −λ/4 phase plate two times, and that half bundles of the stray light respectively pass through the +λ/4 phase plate and the −λ/4 phase plate one time. Accordingly, it is possible to cause polarization state of the reproduction light and the stray light to have a relationship of 90 degrees. That is, an analyzer which allows only the reproduction light or the polarized light of the stray light to pass therethrough is disposed preceding a light receiving surface, whereby it is possible to separate and extract a signal light and a stray light with a simple configuration.

Further, the optical head device according to the present embodiment includes: the extraction optical system 30; the light source (semiconductor laser 1) which emits a light bundle to the optical disk 7 including a plurality of recording layers (L0 layer to L2 layer); and the objective lens 6 which focuses the light bundle emitted from the light source on the recording layer (L1 layer) to be accessed among the plurality of recording layers, wherein: the extraction optical system is disposed in an optical path of the return light 8 reflected by the optical disk through the objective lens, and extracts the signal light component from said return lights with the return light reflected by the recording layer to be accessed among the plurality of recording layers being the signal light component and said return lights reflected by recording layers other than the recording layer to be accessed among the plurality of recording layers being the stray light components.

Accordingly, it is possible to detect a focus error and a tracking error with a simple configuration without increasing an optical path. In addition, it is possible to perform recording and reproducing on a multilayer disk including a plurality of information recording layers with high accuracy.

Next, description will be given of a configuration capable of preventing generation of a focal point error of a light focus spot by using the light receiving device 11 having a light receiving pattern of FIG. 7 to correct a focus error signal offset without reducing an effect of splitting and extracting a reproduction light which is a signal light and a stray light from the return light 8. Note that Japanese Patent Application Laid-Open No. 2006-252599 describes the technology to be referenced.

First, a drawback will be described. For example, with reference to FIG. 1, there is typically decentration in an information track of the optical disk 7, and thus position of the information track when the optical disk 7 is rotated have variations in a radial direction of the optical disk 7 with the light spot focused by the objective lens 6 being a reference. For this reason, an optical head device typically includes control means and an objective lens movable mechanism for moving the objective lens 6. In the optical head device, based on a tracking error signal generated from an output signal detected by a light receiving element of the light receiving device 11, the objective lens 6 is moved by the above-mentioned control means and objective lens movable mechanism. As a result, the optical head device allows an optical spot focused by the objective lens 6 to follow fluctuating positions of the information track.

In the optical head device of FIG. 1, the y direction is set to the radial direction of the optical disk 7. Therefore, in order to perform the control of adjusting a focal point and the control of following the information track, the control means (not shown) and the objective lens movable mechanism (not shown) of the optical head device of FIG. 1 are assumed to move the objective lens 6 in the z direction and the y direction, respectively.

In this case, when the objective lens 6 is moved in the y direction (that is, radial direction of the optical disk 7) for performing the above-mentioned control of following the information track (which is also referred to as "lens shift" hereinafter), a light beam (return light 8) projected onto the light receiving device 11 is moved in the y direction as well.

On the other hand, in the extraction optical system according to the present invention, the boundary B1 between the phase plate 20a and the phase plate 20b and the boundary B2 between the phase plate 21a and the phase plate 21b are set to be parallel to the y direction, as described with reference to FIG. 5. That is, the boundary B1 and the boundary B2 are set in a direction parallel to the focal line Fi_L1 formed into an image into a line shape on a side closer to the cylindrical lens 10 in the optical axis direction (−z direction) than a position at which a smallest circle of confusion is generated by addition of astigmatism to the light beam by the cylindrical lens 10. Accordingly, a signal light component and a stray light component are separated and extracted from the return light 8.

In the configuration of FIG. 5, when optical axis deviation is generated in the direction (x direction) orthogonal to the boundary B1 and the boundary B2, an effect of separating and extracting a signal light component and a stray light component is reduced. Therefore, the optical axis deviation is limited only to the y direction by limiting, to the y direction as described above, the lens shift of the objective lens 6 for allowing the light spot focused by the objective lens 6 to follow the fluctuating position of the information track, whereby it is possible to reduce an offset of a tracking error signal while preventing a reduction in the above-mentioned effect of separating and extracting.

Figure 8:
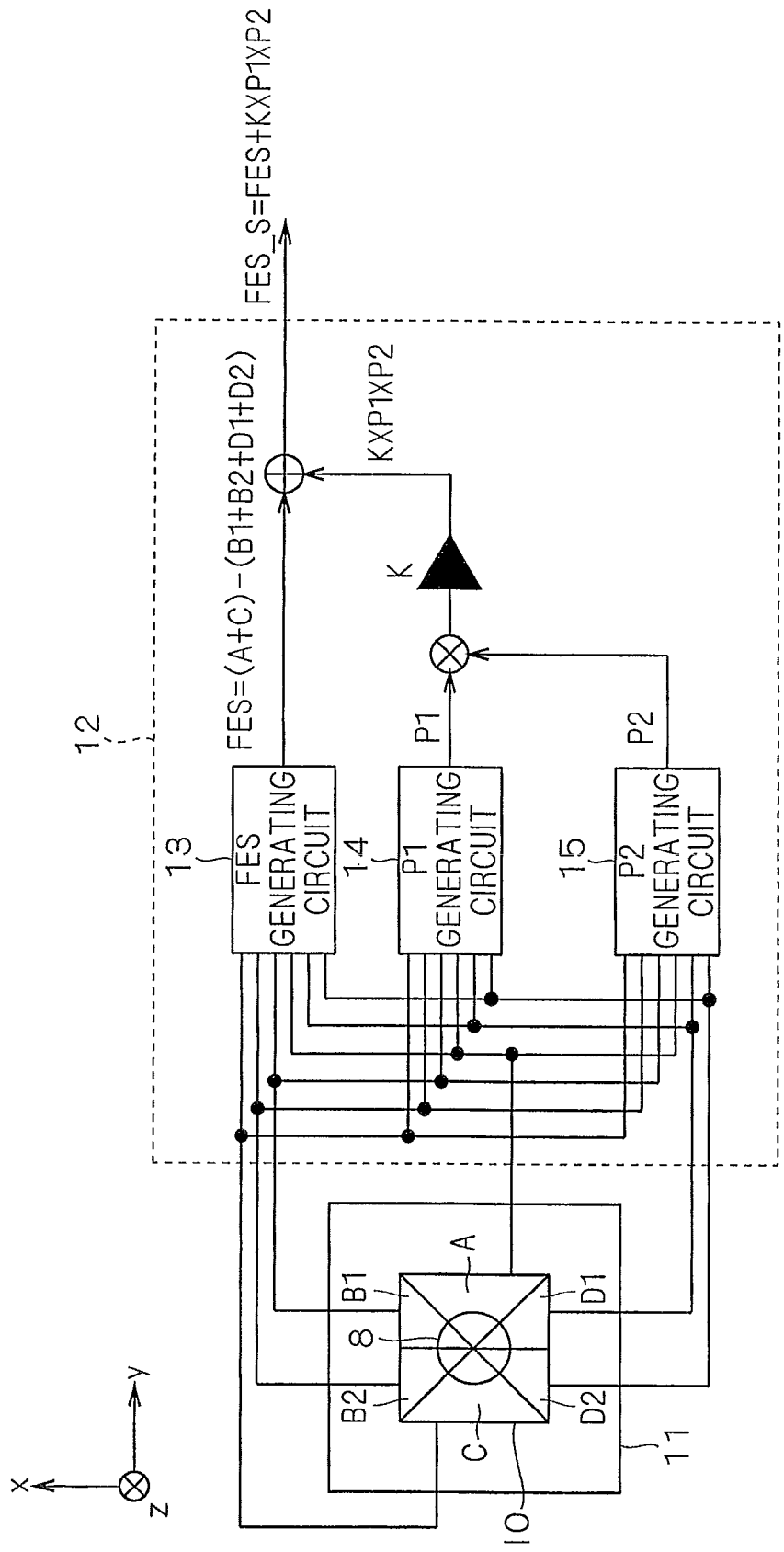
FIG. 8 is a diagram showing still another example of the light receiving surface pattern of the light receiving device and a focus error signal generating circuit.

However, in the case where the lens shift direction and the directions of the boundaries B1 and B2 are caused to coincide with each other (in this case, coincide in the y direction), the received light beam also moves in the y direction on the light receiving device 11 shown in FIG. 8 as described above. In this case, if a focus error signal is generated from a computing equation FES=(A+C)−(B1+B2+D1+D2), there is a problem that in the focus error signal, the offset is generated and the focus point error is generated in the optical disk 7, which deteriorates reproducing performance.

FIG. 8 shows an optical head device for solving the above-mentioned problem. This optical head device includes the above-mentioned light receiving device 11 and a focus error signal generating circuit 12. The focus error signal generating circuit 12 performs computation by combining electrical signals (A1, B1, B2, C, D1, D2) output from respective light receiving elements on the light receiving surface 40 of the light receiving device 11. Then, a focus error signal FES_S obtained by correcting the focus error signal FES is generated. Note that the configuration of the extraction optical system included in the optical head device of FIG. 8 is assumed to be the same as the configuration of FIG. 1, and drawings and description of respective components will be omitted.

The focus error signal generating circuit 12 includes an FES generating circuit 13, a P1 generating circuit 14 and a P2 generating circuit 15. The FES generating circuit 13 generates a focus error signal FES from the following computing equation (1).

$$FES=(A+C)-(B1+B2+D1+D2) \quad (1)$$

The P1 generating circuit 14 generates P1 from a computing equation P1=((A+B1+B2)−(C+D1+D2))/(A+B1+B2+C+D1+D2). The P2 generating circuit 15 generates P2 from a computing equation P2=((A+D1+D2)−(B1+B2+C))/(A+B1+B2+C+D1+D2). This focus error signal generating circuit 12 adds a computational signal (K×P1×P2) obtained by further multiplying a product of the generated output signal P1 and the generated output signal P2 with a gain value K to the FES of equation (1), whereby a corrected focus error signal FES_S is generated. That is, the corrected focus error signal FES_S becomes a signal generated from the following equation (2).

$$FES\_S=(A+C)-(B1+B2+D1+D2)+K1 \times P1 \times P2 \quad (2)$$

A polarity of the gain K is set to a positive or negative value, and a value of K is adjusted such that an offset of the corrected focus error signal FES_S when the objective lens 6 is shifted in the y direction becomes smaller compared with the case where gain K=zero.

If the corrected focus error signal FES_S as described above is used, it is possible to correct an offset of a focus error signal FES in the lens shift, as described in Japanese Patent Application Laid-Open No. 2006-252599. Further, the effect of separating and extracting a signal light component and a stray light component even in the lens shift, and thus it is possible to achieve an optical head device whose reproducing performance is not deteriorated.

Figure 9:
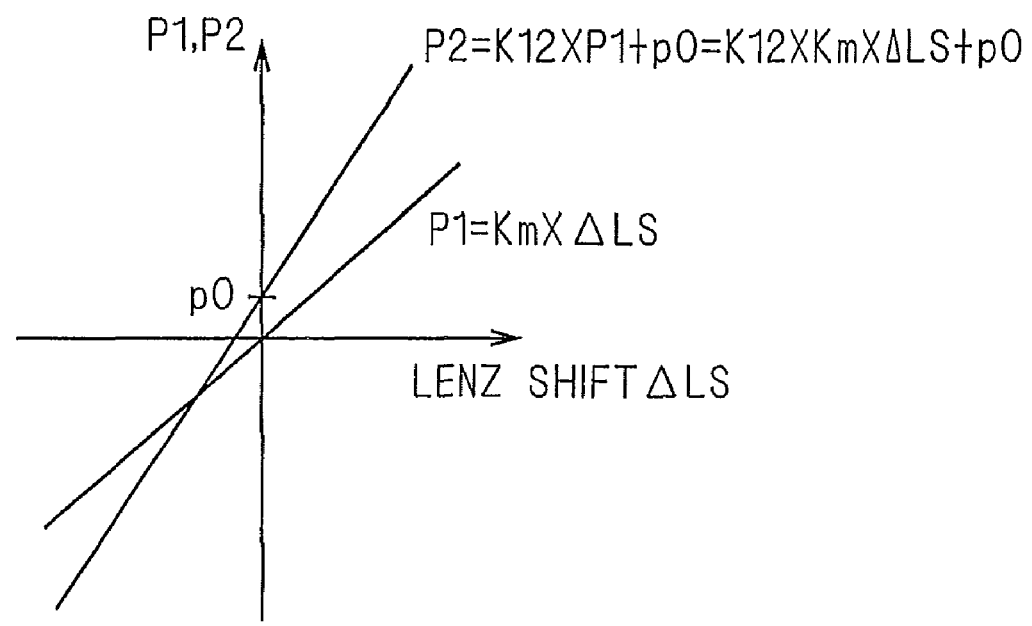
FIG. 9 is a graph showing a relationship between a lens shift ΔLS and output signals P1 and P2.

Next, the optical head device according to the present embodiment will be described. FIG. 9 is a graph showing changes of an output signal P1 and an output signal P2 with respect to a lens shift amount ΔLS from a predetermined reference position. Here, for the sake of convenience, it is assumed that when the lens shift ΔLS=0, the light receiving device 11 is disposed at a position where P1=0, and this will be the basis of the description. Note that this assumption is made for the sake of convenience, and the light receiving device 11 is not necessarily required to be disposed at the position where P1=0 when the lens shift ΔLS=0.

The output signal P1 and the output signal P2 are respectively in a proportional relationship with the lens shift ΔLS, and thus the output signal P2 is proportional to the output signal P1. That is, the output signal P2 can be represented as the equation (3) with the output signal P1 being a variable.

$$P2=K12 \times P1+p0 \quad (3)$$

Here, K12 is a value corresponding to a tilt ratio of the output signal P2 to the output signal P1, and p0 is a value of the output signal P2 when the lens shift ΔLS=0. Therefore, when the equation (3) of P2 is substituted into the equation (2) of the corrected focus error signal FES_S, the following computing equation (4) in which a value of the square of P1 is added is established. Note that in this equation (4), (K×K12) may be composed of one coefficient value.

$$FES\_S=(A+C)-(B1+B2+D1+D2)+K \times K12 \times P1 \times P1 + p0 \times P1 \quad (4)$$

As described above, the light receiving surface 40 which is a light separating and receiving surface of the light receiving device 11 includes a plurality of light receiving surface areas ((A+B1+B2), (C+D1+D2), (A+C), (B1+B2+D1+D2)) for separating the return light 8 into two and receiving them. The focus error signal FES is computed, by the FES generating circuit 13, from the equation (1) by combining output signals in the plurality of light receiving surface areas, which corresponds to a positional deviation of the return light 8 and the light receiving device 11.

The optical head device according to the present embodiment corrects an offset of the focus error signal FES by using a value proportional to the square of a difference signal P1 between an output signal in the first light receiving surface area (A+B1+B2) and an output signal in the second light receiving surface area (C+D1+D2) for separating and receiving the return light 8 with the first light receiving surface area, as represented by the equation (4). FIG. 10 is a diagram showing the configuration of the optical head device according to the present embodiment, which enables the computation of the equation (4).

As described above, according to the optical head device of the present embodiment, as in the case of the configuration of FIG. 8, it is possible to obtain an optical head device capable of correcting an offset of a focus error signal FES without reducing the effect of separating and extracting a signal light component and a stray light component. Further, according to the optical head device of the present embodiment, contrary to the configuration of FIG. 8, the P2 generating circuit 15 can be reduced, which simplifies the configuration. As a result, it is also possible to reduce a cost.

Note that a similar effect is achieved by using, in place of P1, P3 obtained from a calculating equation P3=((A+B1+D1)−(C+B2+D2))/(A+B1+B2+C+D1+D2).

Further, the output signal P1 and the output signal P2 are in a proportional relationship with the lens shift ΔLS, and thus it is possible to represent the output signal P1 and the output signal P2 by P1=Km×ΔLS and P2=K12×Km×ΔLS+p0, respectively, with the lens shift ΔLS being a variable. Here, Km represents a rate of change of the output signal P1 with respect to ΔLS. Therefore, the corrected focus error signal FES_S is calculated from the following calculating equation (5). In this equation (5), (K×K12×Km) and (P0×Km) may be composed of one coefficient value.

$$FES\_S=(A+C)-(B1+B2+D1+D2)+K \times K12 \times Km \times \Delta LS \times \Delta LS + p0 \times Km \times \Delta LS \quad (5)$$

The corrected focus error signal FES_S is represented as above, and hence the optical head device according to the present embodiment may use a value proportional to the square of the lens shift ΔLS in place of the above-mentioned value proportional to the square of the signal difference P1. In this case, the optical head device according to the present embodiment corrects an offset of the focus error signal FES using the value proportional to the square of the lens shift ΔLS, which is a displacement of the objective lens 6, as represented by the expression (5). Even with the configuration as described above, it is possible to obtain an effect similar to that described above.

Note that a signal increasing/decreasing in accordance with a physical moving distance of the objective lens 6 is only required to be used in the lens shift ΔLS, and for example, there may be used an output of a lens position sensor which is separately provided for the objective lens 6 or a tracking control signal in the case of performing tracking control on the objective lens 6 in the radial direction (y direction) of the optical disk 7.

Although description is not given, the optical disk 7 may be irradiated with a plurality of light beams, and a plurality of return lights 8 may be received by the light receiving device 11 including a divided light separating and receiving surface 40 for individually receiving the return lights 8 of the plurality of light beams. In addition, the configuration may be made so as to correct an offset of a tracking error signal in accordance with the lens shift ΔLS of the objective lens 6 by a signal which is computed through combination of detection signals of the plurality of return lights 8.

With the configuration described above, it is possible to detect a focus error and detect a tracking error by using a simple configuration without increasing an optical path. In addition, it is possible to perform highly accurate recording and reproducing on a multilayer disk including a plurality of information recording layers.

Note that in the embodiment of the present invention, the description has been given of the case in which the extraction optical system of the present invention is an optical system of an optical head device which reproduces a multilayer disk or performs recording on a multilayer disk. However, the present invention is not limited thereto, and is generalized by replacing a signal light component with a component of a light reflected from an object to be detected, replacing a stray light component with a component of a light reflected from the object to be detected, replacing a recording layer to be accessed with the object to be detected, and replacing recording layers other than that with those other than the object to be detected. For example, it is also possible to apply the present invention to an optical system which separates a reflected light component from an object to be detected and a reflected light component from one other than the object to be detected, which is positioned with a distance different from the object to be detected, for example, to an optical system of an optical measuring device or an optical system of an optical analyzer.

While the invention has been shown and described in detail, the foregoing description is in all aspects illustrative and not restrictive. It is therefore understood that numerous modifications and variations can be devised without departing from the scope of the invention.

The invention claimed is:

1. An extraction optical system extracting, from a light bundle in which a signal light component and stray light components are mixed, said signal light component,
   said light bundle being supplied through a light focus optical device focusing said light bundle and astigmatism adding means adding astigmatism to said light bundle,
   the extraction optical system comprising:
   a first phase element including:
      a first phase change area generating a phase difference of (+¼) times of a wavelength to polarization components of said light bundle which are in an orthogonal relationship; and
      a second phase change area generating a phase difference of (−¼) times of a wavelength to the polarization components of said light bundle which are in an orthogonal relationship;
   a second phase element including:
      a third phase change area generating a phase difference of (+¼) times of a wavelength to the polarization components of said light bundle which are in an orthogonal relationship; and
      a fourth phase change area generating a phase difference of (−¼) times of a wavelength to the polarization components of said light bundle which are in an orthogonal relationship; and
   a separation element allowing only said signal light component among said signal light component and said stray light components which have passed through said first phase element to pass therethrough, or absorbing or reflecting only said stray light component thereamong in accordance with polarization directions thereof, wherein:
   said first phase element is divided into said first phase change area and said second phase change area by a first boundary, the first boundary being parallel to a first focal line in which said signal light component forms an image into a line shape on a side closer to said light focus optical device than a first focal point position on an optical axis of said light focus optical device at which said signal light component focused by said light focus optical device is formed into a smallest circle of confusion by said astigmatism adding unit, and being orthogonal to the optical axis of said light focus optical device;
   said second phase element is divided into said third phase change area and said fourth phase change area by a second boundary parallel to said first boundary;
   said first phase change area and said third phase change area are disposed to be symmetrical with respect to said first focal line;
   said second phase change area and said fourth phase change area are disposed to be symmetrical with respect to said first focal line;
   said first phase element is disposed between said first focal point position and said first focal line; and
   said second phase element is disposed between said first focal line and a second focal line in which said stray light components form an image into a line shape on a side closer to said light focus optical device than a second focal point position at which said stray light components form a smallest circle of confusion on the side closer to said light focus optical device than said first focal point position.

2. The extraction optical system according to claim 1, further comprising:
a light receiving device disposed at said first focal point position and converting one of said signal light component and said stray light components which have passed through said separation element into an electrical signal.

3. The extraction optical system according to claim 1, wherein said first phase element and said second phase element are formed of a photonic crystal composed of a multilayer film having periodically concavo-convex shape.

4. The extraction optical system according to claim 1, wherein said first phase element and said second phase element are formed of one of a polymer orientation film and a birefringence material including one of a liquid crystal polymer and an optical crystal.

5. The extraction optical system according to claim 1, wherein said first phase element and said second phase element are integrally fixed via a transparent member.

6. An optical head device, comprising:
an extraction optical system extracting, from a light bundle in which a signal light component and stray light components are mixed, said signal light component;
a light source emitting said light bundle to an optical disk including a plurality of recording layers; and
an objective lens focusing said light bundle emitted from said light source on the recording layer to be accessed among said plurality of recording layers,
wherein:
said extraction optical system is supplied with said light bundle through a light focus optical device focusing said light bundle and an astigmatism adding unit adding astigmatism to said light bundle;
said extraction optical system includes:
a first phase element including:
a first phase change area generating a phase difference of (+¼) times of a wavelength to polarization components of said light bundle which are in an orthogonal relationship; and
a second phase change area generating a phase difference of (−¼) times of a wavelength to the polarization components of said light bundle which are in an orthogonal relationship;
a second phase element including:
a third phase change area generating a phase difference of (+¼) times of a wavelength to the polarization components of said light bundle which are in an orthogonal relationship; and
a fourth phase change area generating a phase difference of (−¼) times of a wavelength to the polarization components of said light bundle which are in an orthogonal relationship; and
a separation element allowing only said signal light component among said signal light component and said stray light components which have passed through said first phase element to pass therethrough, or absorbing or reflecting only said stray light component among said signal light component and said stray light components in accordance with polarization directions thereof; and
a light receiving device disposed at a first focal point position on an optical axis of said light focus optical device at which said signal light component focused by said light focus optical device is formed into a smallest circle of confusion by said astigmatism adding unit and converting one of said signal light component and said stray light components which have passed through said separation element into an electrical signal;
said first phase element is divided into said first phase change area and said second phase change area by a first boundary, the first boundary being parallel to a first focal line in which said signal light component forms an image into a line shape on a side closer to said light focus optical device than said first focal point position, and being orthogonal to the optical axis of said light focus optical device;
said second phase element is divided into said third phase change area and said fourth phase change area by a second boundary parallel to said first boundary;
said first phase change area and said third phase change area are disposed to be symmetrical with respect to said first focal line;
said second phase change area and said fourth phase change area are disposed to be symmetrical with respect to said first focal line;
said first phase element is disposed between said first focal point position and said first focal line;
said second phase element is disposed between said first focal line and a second focal line in which said stray light components form an image into a line shape on a side closer to said light focus optical device than a second focal point position at which said stray light components form a smallest circle of confusion on the side closer to said light focus optical device than said first focal point position; and
said extraction optical system is disposed, together with said light focus optical device and said astigmatism adding means, in an optical path of return lights reflected by said optical disk through said objective lens, and extracts said signal light component from said return lights with said return light reflected by said recording layer to be accessed among said plurality of recording layers being said signal light component and said return lights reflected by recording layers other than said recording layer to be accessed among said plurality of recording layers being said stray light components.

7. The optical head device according to claim 6, wherein said light receiving device includes a light separating and receiving surface for detecting a focus error signal or a tracking error signal for controlling a position of said objective lens.

8. The optical head device according to claim 7, wherein a direction in which said objective lens shifts is parallel to a second boundary of said second phase element and a first boundary of said first phase element.

9. The optical head device according to claim 7, wherein:
said light receiving device includes a plurality of light receiving surface areas formed by combining respective surfaces of said light separating and receiving surface, and dividing said return lights evenly into two and receiving said return light divided;
said focus error signal is computed by combining output signals in said plurality of light receiving surface areas, and corresponds to a positional deviation of said return light and said light receiving device; and
an offset of said focus error signal is corrected by using a value proportional to a square of a difference signal between an output signal in a first one of said light receiving surface areas and an output signal in a second one of the light receiving surface areas, the second one dividing said return lights with said first one of said light receiving surface areas and receiving said return lights divided.

10. The optical head device according to claim 7, wherein:
said light receiving device includes a plurality of light receiving surface areas formed by combining respective surfaces of said light separating and receiving surface, and dividing said return light evenly into two and receiving said return light divided;

said focus error signal is computed by combining output signals in said plurality of light receiving surface areas, and corresponds to a positional deviation of said return light and said light receiving device; and an offset of said focus error signal is corrected using a value proportional to a square of a displacement of said objective lens.

* * * * *